March 30, 1937. G. H. THOMAS 2,075,481
COUPLING
Filed March 22, 1935

Inventor
George H. Thomas
By Florian H. Miller
Attorney

# UNITED STATES PATENT OFFICE 2,075,481

COUPLING

George Harold Thomas, Erie, Pa.

Application March 22, 1935, Serial No. 12,391

10 Claims. (Cl. 64—31)

This invention relates to shaft couplings and more particularly to flexible shaft couplings by which power can be transmitted from one shaft to another when said shafts are misaligned angularly, off-center, or both; and also to permit substantial endwise and rotational movement.

All devices made according to the prior art and with which I am familiar, utilize relatively small portions of their bearing surfaces resulting in excessive wear on the bearing surfaces at localized points. The life of the coupling is therefore shortened, it becomes very noisy, and the efficiency of the transmission is greatly decreased. These prior devices have required expensive machine operations besides presenting many difficult problems in assembly and disassembly.

It is accordingly an object of my invention to provide a coupling which will overcome these defects and it is the principal object of my invention to provide a coupling which has a pressure exerted on its bearing surfaces of equal magnitude at all points assuring uniform wear on the bearing surfaces.

Another object of my invention is to provide a coupling which is easy to manufacture, economical in use, and easy to maintain.

Another object of my invention is to provide a coupling which permits the parts to be readily repaired or replaced with a minimum of effort and expense without molesting or disengaging and engaging the connecting machines.

Another object of my invention is to provide a coupling which will require a minimum of expensive machine work.

Another object of my invention is to provide a coupling whose bearing surfaces and other parts thereof are lubricated at all times.

Another object of my invention is to provide a coupling which may be easily and quickly connected and disconnected.

Other objects of my invention will become evident from the following detailed description, taken in conjunction with the accompanying drawing, in which Fig. 1 is a view in side elevation taken on the line 1—1 of Fig. 2 of my novel invention;

Figure 1:
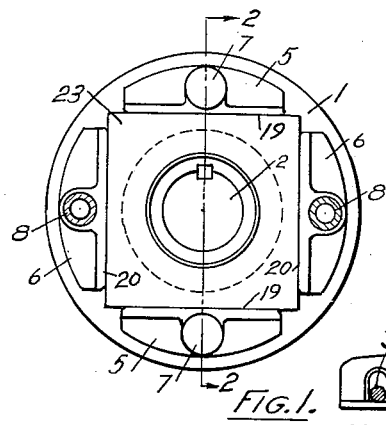
Figures 2, 2A:
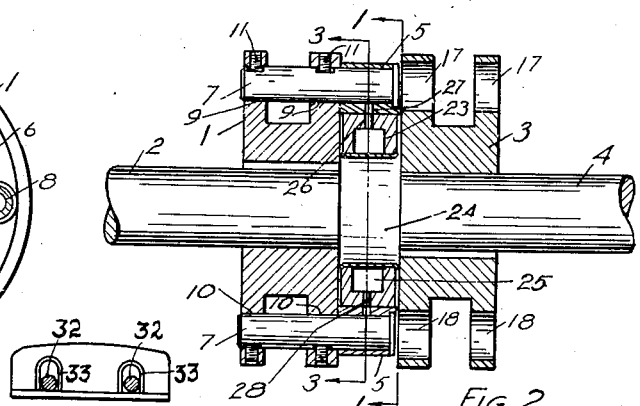
Fig. 2 is a sectional view taken on the line 2—2 of Fig. 1.
Fig. 2a is a modified form of lug mounting.
Figure 3:
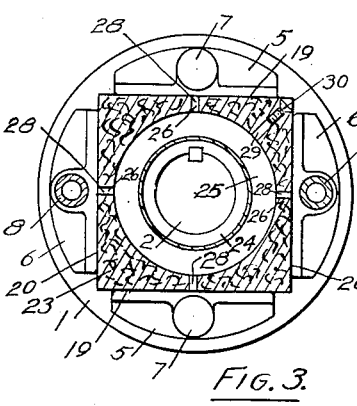
Fig. 3 is a view taken on the line 3—3 of Fig. 2 showing the coupling member in section.
Figure 4:
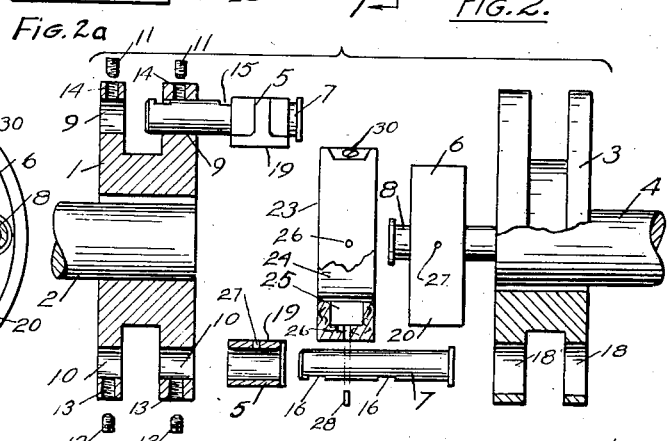
Fig. 4 is a fragmentary view in side elevation of my novel invention in a position for quick assembly.

Referring to Figures 1 and 2 of the drawing, a driving member 1 mounted on a driving shaft 2 and a driven member 3 mounted on a driven shaft 4 have pivoted detachable projections or lugs 5 and 6 mounted thereon. The driving member 1 and the driven member 3 are identical and therefore the shafts 2 and 4 may be driven in reverse as well as in a forward direction. Pins 7 and 8, preferably of a metal having a high resistance against shearing action, provide supports for the lugs 5 and 6. Apertures 9 and 10 are disposed to receive the pins 7 (apertures for pins 8 not shown) which are secured therein by set-screws 11 and 12 extending into apertures 13 and 14 in alignment with apertures 15 and 16 in the pins 7. It will be apparent that any form of locking means may be used to lock the pins 7 and 8 in a secure manner. Apertures 17 and 18 are of such diameter and disposed in such a position that pins 7 may be withdrawn without disassembly of any part of the coupling. Structural details which relate to pins 8 are identical with those of pins 7 described above.

Figure 6:
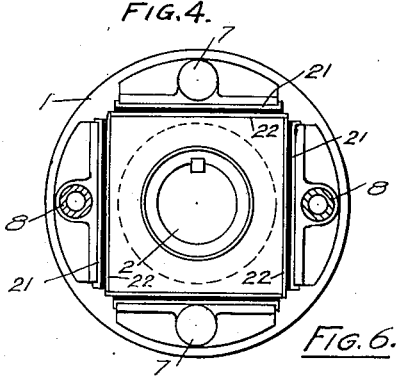
Fig. 6 is a view in side elevation showing another modified form of my invention.

The lugs 5 and 6 are provided with diametrically opposed bearing surfaces 19 and 20 disposed in parallel relation, Fig. 6 shows a modified form of my invention in which strips 21 and 22 of a suitable bearing metal or other members of an elastic character are disposed on the bearing surfaces 19 and 20 of the lugs 5 and 6 and on the bearing surface of the coupling member. Any form of fastening means may be used to secure these strips 21 and 22. When the strips 21 or 22 are of an elastic character, it will be apparent that torsional elasticity will be provided. The lugs 5 and 6 are so disposed on the driving and driven members 1 and 3 that these members become complementary when they are assembled.

Figure 5:
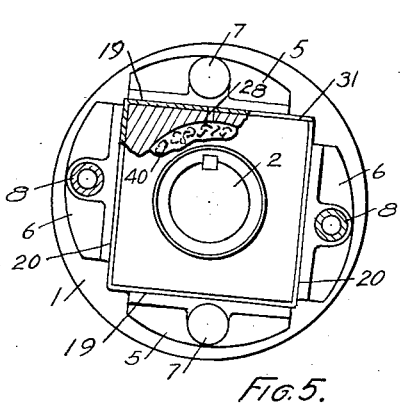
Fig. 5 is a view in side elevation partly in section of a modified form of my novel invention.

A coupling member 23, which has a central aperture 24 and which is substantially square and preferably made of a nonmetallic material, is disposed between the parallel surfaces 19 and 20 of the lugs 5 and 6 and prevents any relative movement of a substantial nature between the driving and driven members 1 and 3. A reservoir 25 is provided in the inner part of the coupling member 23 to carry a lubricant. The reservoir 25 may be provided with an absorbent material 40 such as is shown in Fig. 5 to assure a more even flow of the lubricant contained in the reservoir 25. Radially extending apertures 26 which are normally in alignment with apertures 27 in the lugs 5 and 6 provide passages for the lubricant, the lubricant passing through these passages to the surfaces where friction takes place. A plug 28 such as a porous wood reed is disposed in the apertures 26 in order that there will be a gradual seepage of the lubricant from the reservoir 25 rather than a heavy flow which would quickly empty the reservoir 25. Aperture 29 leading from one corner of the coupling member 23 to the reservoir 25 and preferably plugged by a head screw 30, is used as a passage for filling the reservoir 25. By this arrangement, all friction surfaces are continually lubricated.

Fig. 5 shows a modified form of construction in which strips 31 of bearing metal or other members of an elastic nature are secured to the outer surfaces of the coupling member 23 which contact with the bearing surfaces 19 and 20 of the lugs 5 and 6. It will be understood that the strips 21, 22, and 31 which are of an elastic nature provide some torsional elasticity. My coupling is especially adapted for strips which are of an elastic nature because of the maximum bearing surface being utilized which eliminates the destruction of these elastic strips as takes place in the present couplings due to all of the pressure being exerted in a particular area.

Fig. 2a shows a modified form of lug mounting whereby stationary stop members 32 are detachably mounted on the driving and driven members 1 and 3 for cooperation with slots 33 provided in the lug. This mounting permits the pressure to be exerted on all portions of the bearing surfaces 19 and 20 of the lugs 5 and 6.

In operation, the coupling member 23 is disposed between the diametrically opposed lugs 5 and 6 of the complementary driving member 1 and the driven member 3. This prevents any substantial relative rotation between the driving and driven members 1 and 3 and permits transmission of direct force. When the elastic strips are provided on the bearing surfaces 19 and 20 of the lugs 5 and 6, considerable torsional elasticity is permitted between the driving and driven members 1 and 3. The coupling may be operated forwardly and in reverse. Misalignment angularly and/or off-center, as well as substantial endwise and rotational movement is provided for by my novel coupling.

It will be apparent from the above description that I have provided a coupling which is easy to machine, easy to assemble or disassemble, and which has all bearing surfaces in full contact providing a more efficient coupling and one with a longer life.

Various changes may be made in the specific embodiment of the present invention without diverting from the spirit thereof or within the scope of the appended claims.

What I claim is:

1. A coupling comprising a driving and a driven element, tiltably mounted members carried by said driving and driven elements having inner bearing surfaces adapted to remain in parallel relation with their oppositely disposed bearing surfaces and at substantial right angles to adjacently disposed bearing surfaces upon substantial relative rotation of said driving and driven elements, and means engaging said inner surfaces to prevent substantial relative rotation of said driving and driven elements.

2. A coupling comprising a driving and a driven element, tiltably mounted members carried by said driving and driven elements having inner bearing surfaces adapted to remain in parallel relation with their oppositely disposed bearing surfaces and at substantial right angles to adjacently disposed bearing surfaces upon substantial relative rotation of said driving and driven elements, said bearing surfaces of said parallel members being provided with bearing strips, and means engaging said inner surfaces to prevent substantial relative rotation of said driving and driven elements.

3. A coupling comprising complementary members, pivoted lugs carried by said members having inner bearing surfaces adapted to remain in parallel relation upon substantial relative movement of the driving and driven complementary members, and a substantially square coupling member engaging the inner surfaces of said lugs to transmit power from one complementary member to the other.

4. A coupling comprising a driving and a driven member, diametrically opposed pivoted lugs having inner bearing surfaces adapted to remain in parallel relation upon substantial relative movement of said driving and driven members, a quadrangular coupling member engaging said inner bearing surfaces, and lubricating means for said lugs.

5. A coupling comprising complementary hub members, diametrically opposed pivoted lugs carried by said hub members having inner bearing surfaces adapted to remain in a substantially parallel relation after substantial relative movement of said hub members, and a quadrangular coupling member engaging the inner surfaces of said lugs for transmitting power from one complementary member to the other and for providing lubrication for the engaging surfaces.

6. A coupling comprising complementary hub members, pivoted projections on said members diametrically opposed and having inner bearing surfaces adapted to remain in parallel relation upon substantial relative movement of said hub members, and a coupling member coacting with said projections to transmit power from one hub member to the other, the engaging surfaces of said pivoted projections and said coupling member being provided with elastic strips.

7. A coupling comprising a driving and a driven member, pivoted lugs carried by said driving and driven members having oppositely disposed bearing surfaces adapted to remain in parallel relation upon relative movement of said driving and driven members, said bearing surfaces having elastic strips secured thereon, and a square coupling member for engaging said bearing surfaces of said lugs and for providing lubrication for all bearing surfaces.

8. A coupling comprising a driving and a driven member, pivoted lugs carried by said driving and driven members having oppositely disposed inner bearing surfaces adapted to remain in parallel relation upon relative movement of said driving and said driven member, and a square coupling member having elastic strips on the bearing surfaces thereof engaging said inner surfaces and having lubricating means for said lugs.

9. A coupling comprising a driving and a driven element, pivoted members movably mounted on said driving and driven elements having inner bearing surfaces adapted to remain in parallel relation with oppositely disposed bearing surfaces and at substantially right angles with adjacently disposed bearing surfaces upon substantial relative rotation of said driving and driven elements, and a coupling member coacting with the bearing surfaces of said members to transmit power from the driving member to the driven member, engaging surfaces of said movable members and said coupling member being provided with flexible strips.

10. In a coupling having a floating block connection, in combination, a driving and a driven member, a plurality of detachable pivoted jaws having inner bearing surfaces disposed on said driving and driven members in substantial parallel relation to oppositely disposed inner bearing surfaces, and a coupling member coacting with the inner bearing surfaces of said jaws to transmit power from said driving to said driven member.

GEORGE HAROLD THOMAS.